US008457677B2

(12) United States Patent
Komine et al.

(10) Patent No.: US 8,457,677 B2
(45) Date of Patent: Jun. 4, 2013

(54) TRANSMISSION POWER CONTROL OF MOBILE STATION

(75) Inventors: Toshihiko Komine, Fujimino (JP); Takeo Ohseki, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 216 days.

(21) Appl. No.: 12/897,337

(22) Filed: Oct. 4, 2010

(65) Prior Publication Data

US 2011/0081938 A1    Apr. 7, 2011

(30) Foreign Application Priority Data

Oct. 5, 2009  (JP) ................................. 2009-231920

(51) Int. Cl.
 *H04B 7/00* (2006.01)
(52) U.S. Cl.
 USPC ..... 455/522; 455/67.11; 455/436; 455/127.5; 455/574; 455/572
(58) Field of Classification Search
 USPC .......... 455/522, 572, 574, 127.5, 296, 67.11, 455/436
 See application file for complete search history.

(56) References Cited

U.S. PATENT DOCUMENTS

| 8,280,386 | B2 * | 10/2012 | Oh et al. ....................... 455/447 |
| 2006/0234752 | A1 * | 10/2006 | Mese et al. .................... 455/522 |
| 2007/0197254 | A1 * | 8/2007 | Borran et al. ................. 455/522 |
| 2009/0149140 | A1 * | 6/2009 | Borran et al. ............. 455/114.2 |
| 2009/0196192 | A1 * | 8/2009 | Lim et al. ...................... 370/252 |
| 2010/0008311 | A1 * | 1/2010 | Oh et al. ........................ 370/329 |
| 2010/0144381 | A1 * | 6/2010 | Park et al. ...................... 455/501 |
| 2010/0227615 | A1 * | 9/2010 | Gaal et al. ..................... 455/436 |
| 2010/0291962 | A1 * | 11/2010 | Kim et al. ...................... 455/522 |
| 2010/0322079 | A1 * | 12/2010 | Kitazoe et al. ................ 370/241 |
| 2011/0070919 | A1 * | 3/2011 | Komine et al. ............... 455/522 |
| 2011/0207499 | A1 * | 8/2011 | Liu ............................... 455/522 |
| 2012/0064936 | A1 * | 3/2012 | Vrzic et al. .................... 455/522 |

FOREIGN PATENT DOCUMENTS

JP   2008-092545   4/2008

OTHER PUBLICATIONS

3GPP2 C.S0084-002-0, "Medium Access Control Layer for Ultra Mobile Broadband (UMB) Air Interface Specification", Version 3.0, Nov. 2008.

\* cited by examiner

*Primary Examiner* — Temesgh Ghebretinsae
*Assistant Examiner* — Md Talukder
(74) *Attorney, Agent, or Firm* — Morgan, Lewis & Bockius LLP (57) ABSTRACT

A transmission power control device is able to capture the serving sector measurement information of a mobile station with respect to a serving sector and the neighboring sector measurement information of the mobile station with respect to a neighboring sector. The transmission power control device selects a power control mode based on a decision as to whether or not the neighboring sector measurement information has been captured in an applied time in the past. The power level of a mobile station is determined based on the selected power control mode. Thus, it is possible to reduce inter-cell interference and inter-sector interference because the power level of a mobile station is determined in light of communication environments, even though the mobile station is connected with a base station in an LTE-based communication system which cannot always detect the neighboring sector measurement information.

6 Claims, 3 Drawing Sheets

TRANSMISSION POWER CONTROL OF MOBILE STATION

BACKGROUND OF THE INVENTION

1. Field of the Invention

The present invention relates to transmission power controls (or uplink power controls) of mobile stations (e.g. mobile phones) in mobile communication systems.

The present application claims priority on Japanese Patent Application No. 2009-231920, the content of which is incorporated herein by reference.

2. Description of the Related Art

In Long Term Evolution (LTE) (recently developed as 4G, i.e. Fourth Generation wireless network), base stations are able to communicate the allocation information and the interference information such as overload indicators (OI) and high interference indicators via backbone networks, so that base stations can cooperate together based on such information. Each sector uses an overload indicator (OI) to communicate the interference information to a neighboring sector in units of frequency blocks (i.e. minimum units of allocating radio resources or consecutive frequency bands). The interference information has three stages, denoted with numerals "0", "1", and "2", wherein a higher interference level has a higher numeral.

A transmission power control using the interference information detected in neighboring sectors has been developed and disclosed in Patent Document 1 and Non-Patent Document 1, both of which refer to a method for determining transmission power controls in mobile stations. This method is implemented in accordance with standardization specifications of cellular systems, known as Ultra Mobile Broadband (UMB).

Specifically, Patent Document 1 teaches a method for determining power increase/decrease based on the overall interference information (i.e. the interference information regarding all frequency bands) which is calculated in connection with a sector having a minimum path loss (i.e. a power loss which occurs when radio waves move through space along a specific path) among sectors except for serving sectors (or serving sectors). A basic operation of transmission power control is implemented in accordance with a policy in which power is decreased or maintained (without change) with respect to a high level of interference whilst power is increased or maintained with respect to a low level of interference. A determination as to whether to increase or decrease power is made in light of a probability, which is calculated based on a present power level and a difference between a path loss of a serving sector and a "minimum" path loss of a certain sector which differs from the serving sector. Non-Patent Document 1 teaches three stages, denoted with numerals "0", "1", and "2" in IoT-Level (where "IoT" stands for "Interference over Thermal"), as the interference information. A transmission power control using a path loss difference is able to reduce interference between cells and interference between sectors.

Patent Document 1: Japanese Patent Application Publication No. 2008-92545

Non-Patent Document 1: 3GPP2 C. S0084-002-0, "Medium Access Control Layer For Ultra Mobile Broadband (UMB) Air Interface Specification"

The above method determines a power increase/decrease in a mobile station based on a difference between a path loss occurring between a mobile station and a serving sector and a path loss occurring between the mobile station and another sector which differs from the serving sector. In some mobile communication systems such as an LTE-based mobile communication system, a base station is unable to obtain the information (e.g. a path loss occurring between a mobile station and a neighboring sector) regarding other sectors which differ from a serving sector; hence, it is impossible to estimate a path loss with respect to other sectors. In this case, it is impossible to determine a power increase/decrease with respect to a mobile station, in other words, it is impossible to adopt the above method for determining transmission power in a mobile station.

SUMMARY OF THE INVENTION

It is an object of the present invention to provide a transmission power control technology which is able to reduce interference between cells and interference between sectors in a mobile station irrespective of a mobile communication system in which a base station cannot always obtain the information regarding other sectors except for a serving sector.

The present invention provides a transmission power control device that includes a serving sector measurement information capture unit that captures the serving sector measurement information of a mobile station with respect to a serving sector, a neighboring sector measurement information capture unit that captures the neighboring sector measurement information of the mobile station with respect to a neighboring sector, and a power control mode select unit that selects a power control mode based on a decision as to whether or not the neighboring sector measurement information capture unit has captured the neighboring sector measurement information of the mobile station.

The power control mode select unit selects a first power control mode based on the serving sector measurement information and the neighboring sector measurement information when the neighboring sector measurement information capture unit has captured the neighboring sector measurement information, whilst it selects a second power control mode based on the serving sector measurement information when the neighboring sector measurement information capture unit has not captured the neighboring sector measurement information.

Alternatively, the power control mode select unit selects a power control mode based on a decision as to whether or not the neighboring sector measurement information capture unit has captured the neighboring sector measurement information in an applied time in the past.

The neighboring sector measurement information capture unit outputs the neighboring sector measurement information, which has been captured in an applied time in the past, to the power control mode select unit. Subsequently, the power control mode select unit selects a power control mode based on a decision as to whether or not the power control mode select unit has received the neighboring sector measurement information from the neighboring sector measurement information capture unit.

The transmission power control device further includes a power level determination unit that determines a power level of a mobile station based on a power control mode which is selected by the power control mode select unit.

The present invention provides a transmission power control method including a step of capturing the serving sector measurement information of a mobile station with respect to a serving sector, a step of capturing the neighboring sector measurement information of the mobile station with respect to a neighboring sector, and a step of selecting a power control mode based on a decision as to whether or not the neighboring sector measurement information of the mobile station has been captured.

The present invention further provides a program allowing a computer to implement the above transmission power control method.

Even though a mobile station is connected with a base station in a LTE-based communication system which cannot always detect the neighboring sector measurement information, it is possible to reduce inter-cell interference and inter-sector interference because the power level of the mobile station is determined in an appropriate power control mode which is selected in light of communication environments as to whether or not the base station can detect the neighboring sector measurement information.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
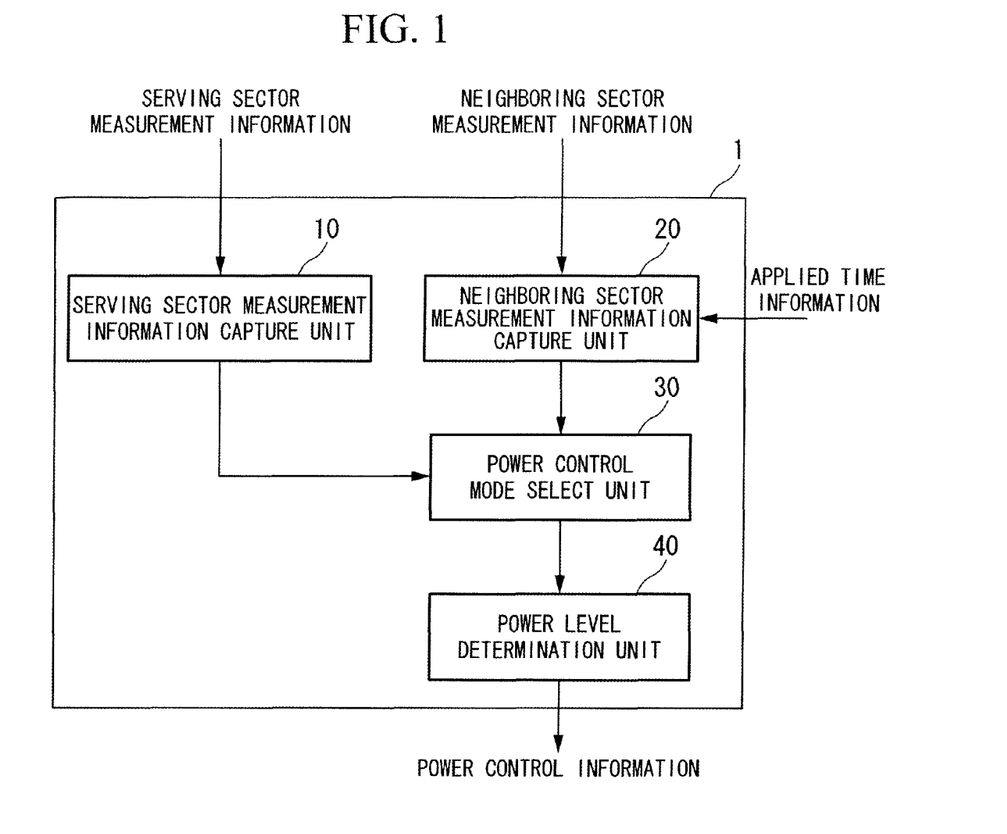
FIG. 1 is a block diagram showing a transmission power control device according to an embodiment of the present invention.

A transmission power control device (or an uplink power control device) 1 according to an embodiment of the present invention will be described in detail with reference to FIGS. 1 to 3. The transmission power control device 1 is installed in a base station (not shown) in a cellular system, thus providing functionality regarding an uplink power control. The transmission power control device 1 is constituted of a serving sector measurement information capture unit 10, a neighboring sector measurement information capture unit 20, a power control mode select unit 30, and a power level determination unit 40.

The serving sector measurement information capture unit 10 captures the serving sector measurement information representing a result of measurement performed by a mobile station on a serving sector (or a connected sector). The serving sector measurement information includes the reception power level information (known as "RSRP", which stands for "Reference Signal Received Power") of a serving sector, which is communicated from a mobile station subjected to transmission power control, the path loss information representing a path loss occurring between the serving sector and the mobile station, and the redundant power information (known as "Power Headroom") communicated from the mobile station. In response to a request from the power control mode select unit 30 or each time when capturing the serving sector measurement information, the serving sector measurement information capture unit 10 sends the serving sector measurement information to the power control mode select unit 30.

The neighboring sector measurement information capture unit 20 captures the neighboring sector measurement information representing a result of measurement performed by a mobile station on a neighboring sector which differs from the serving sector. The neighboring sector measurement information includes the reception power level information (RSRP) which is communicated from a mobile station subjected to transmissions power control, the path loss information representing a path loss occurring between a neighboring sector and a mobile station, and the redundant power information which is communicated from a mobile station. The neighboring sector measurement information will be referred to as "Measurement Report". The neighboring sector measurement information capture unit 20 temporarily stores the neighboring sector measurement information.

The neighboring sector measurement information capture unit 20 inputs the applied time information from an external device (not shown). The applied time information designates a time period in which the neighboring sector measurement information is applicable to a transmission power control in a mobile station. The applied time information constrains (or limits) an applied time of the neighboring sector measurement information applied to a transmission power control in the power control mode select unit 30 and the power level determination unit 40. The neighboring sector measurement information capture unit 20 stores the applied time information in a referential area.

In response to a request from the power control mode select unit 30, the neighboring sector measurement information capture unit 20 outputs the neighboring sector measurement information, which is captured in an applied time (designated by the applied time information) in the past, to the power control mode select unit 30. In other words, the neighboring sector measurement information capture unit 20 is able to output the neighboring sector measurement information, which is captured in an applied time in the past, to the power control mode select unit 30; but the neighboring sector measurement information capture unit 20 is unable to output the neighboring sector measurement information to the power control mode select unit 30 when it fails to capture the neighboring sector measurement information in an applied time in the past. In this connection, even when the neighboring sector measurement information capture unit 20 previously captured the neighboring sector measurement information before an applied time in the past and even when the previously captured neighboring sector measurement information has not been output to the power control mode select unit 30, the neighboring sector measurement information capture unit 20 does not output the previously captured neighboring sector measurement information to the power control mode select unit 30.

When the neighboring sector measurement information capture unit 20 captures a plurality of the neighboring sector measurement information in an applied time in the past, the neighboring sector measurement information capture unit 20 may output the "latest" neighboring sector measurement information to the power control mode select unit 30. Alternatively, the neighboring sector measurement information capture unit 20 may calculate an average value among the plurality of the neighboring sector measurement information, thus outputting it to the power control mode select unit 30.

The power control mode select unit 30 receives the serving sector measurement information from the serving sector measurement information capture unit 10 and the neighboring sector measurement information from the neighboring sector measurement information capture unit 20.

The power control mode select unit 30 selects a power control mode of a mobile station based on a decision as to whether or not the neighboring sector measurement information capture unit 20 has captured the neighboring sector measurement information. Specifically, the power control mode select unit 30 selects a power control mode of a mobile station based on a decision as to whether or not the neighboring sector measurement information capture unit 20 has captured the neighboring sector measurement information in an applied time (designated by the applied time information) in the past.

When the neighboring sector measurement information capture unit 20 has captured the neighboring sector measurement information in an applied time (designated by the applied time information) in the past, in other words, when the power control mode select unit 30 has received the neighboring sector measurement information from the neighboring sector measurement information capture unit 20, the power control mode select unit 30 selects a power control mode of a mobile station based on the serving sector measurement information from the corrected sector measurement information capture unit 10 and the neighboring sector measurement information from the neighboring sector measurement information capture unit 20. In contrast, when the neighboring sector measurement information capture unit 20 has not captured the neighboring sector measurement information in an applied time in the past, in other words, when the power control mode select unit 30 has not received the neighboring sector measurement information from the neighboring sector measurement information capture unit 20, the power control mode select unit 30 selects a power control mode of a mobile station based on the serving sector measurement information from the serving sector measurement information capture unit 10.

Specifically, when the power control mode select unit 30 has received the neighboring sector measurement information from the neighboring sector measurement information capture unit 20, the power control mode select unit 30 selects a power control mode of a mobile station based on the serving sector measurement information and the neighboring sector measurement information in accordance with Equation (1).

$$X_{PL} = \frac{(RSRP_{ServingSector} - RSRP_{StrongestNeighbour}) - P_{PLdiff\_min}}{P_{PLdiff\_max} - P_{PLdiff\_min}} \quad (1)$$

In Equation (1), $X_{PL}$ represents a power control coefficient which is used in a power level determination procedure of the power level determination unit 40, a detailed explanation of which will be described later. $RSRP_{ServingSector}$ represents a reception power level, which is included in the serving sector measurement information and measured by a mobile station receiving a signal from a serving sector. $RSRP_{StrongestNeighbour}$ represents a reception power level, which is included in the neighboring sector measurement information and measured by a mobile station receiving a signal from a neighboring sector. $P_{PLdiff\_max}$ and $P_{PLdiff\_min}$ represent preset parameters from an external device.

When the power control mode select unit 30 has not received the neighboring sector measurement information from the neighboring sector measurement information capture unit 20, the power control mode select unit 30 selects a power control mode of a mobile station based on the serving sector measurement information from the serving sector measurement information capture unit 20 in accordance with Equation (2).

$$X_{PL} = \frac{P_{PL\_max} - PL(u)}{P_{PL\_max} - P_{PL\_min}} \quad (2)$$

In Equation (2), $X_{PL}$ represents a power control coefficient which is used in a power level determination procedure of the power level determination unit 40. PL(u) represents a path loss occurring between a mobile station and a serving sector, which is included in the serving sector measurement information. $P_{PL\_max}$ and $P_{PL\_min}$ represent parameters from an external device.

In summary, the power control mode select unit 30 selects a power control mode according to Equation (1) using the neighboring sector measurement information when the neighboring sector measurement information capture unit 20 has captured the neighboring sector measurement information in an applied time (designated by the applied time information) in the past. Alternatively, the power control mode select unit 30 selects a power control mode according to Equation (2), which does not need the neighboring sector measurement information, when the neighboring sector measurement information capture unit 20 has not captured the neighboring sector measurement information in an applied time in the past.

The power control mode select unit 30 outputs the power control mode information representing a selected power control mode and the power control input information which is used in a power level determination procedure implementing a selected power control mode. The power control input information includes the serving sector measurement information or both of the serving sector measurement information and the neighboring sector measurement information.

Specifically, when the power control mode select unit 30 selects a power control mode of a mobile station according to Equation (1) on the basis of the serving sector measurement information from the serving sector measurement information capture unit 10 and the neighboring sector measurement information from the neighboring sector measurement information capture unit 20, the power control mode select unit 30 provides the power level determination unit 40 with the power control mode information representing the selected power control mode according to Equation (1) and the power control information which includes both the serving sector measurement information and the neighboring sector measurement information and which is used in a power level determination procedure according to Equation (1).

When the power control mode select unit 30 selects a power control mode of a mobile station according to Equation (2) on the basis of the serving sector measurement information from the serving sector measurement information capture unit 10, the power control mode select unit 30 provides the power level determination unit 40 with the power control mode information representing a selected power control mode according to Equation (2) and the power control input information including the serving sector measurement information which is used in a power level determination procedure according to Equation (2).

The power level determination unit 40 receives the power control mode information and the power control input information (which includes the serving sector measurement information or both the serving sector measurement information and the neighboring sector measurement information) which is used in a power level determination procedure in a selected power control mode (designated by the power control mode information) from the power control mode select unit 30. The power level determination unit 40 determines a transmission power level of a mobile station based on those information output from the power control mode select unit 30.

When the power level determination unit 40 receives the power control mode information (which declares that a power control mode of a mobile station is selected based on the serving sector measurement information and the neighboring sector measurement information) and the power control input information (which includes the serving sector measurement information or both the serving sector measurement information and the neighboring sector measurement information) from the power control mode select unit 30, the power level determination unit 40 determines a transmission power level of a mobile station based on a selected power control mode (designated by the power control mode information) as well as the power control input information.

Specifically, when the power level determination unit 40 receives the power control mode information (which selects a power control mode of a mobile station according to Equation (1)) and the power control input information including both the serving sector measurement information and the neighboring sector measurement information (which are used in a power level determination procedure according to Equation (1)) from the power control mode select unit 30, the power level determination unit 40 calculates the power control coefficient $X_{PL}$ in accordance with Equation (1) using the reception power level $RSRP_{ServingSector}$ of the serving sector measurement information) and the reception power level $RSRP_{StrongestNeighbour}$ of the neighboring sector measurement information. Subsequently, the power level determination unit 40 determines a power level $\Delta_{PSCH}$ in accordance with Equation (3) using the calculated power control coefficient $X_{PL}$.

if(IoTLevel(J)>1.0)$\Delta_{PUSCH}$=−4 dB

Else if(IoTLevel(J)>0.5)

If(1−$X_{PL}$>$X_{rand}$)$\Delta_{PUSCH}$=−4 dB

Else $\Delta_{PUSCH}$=−1 dB     (3)

Else

If(1−$X_{PL}$>$X_{rand}$)$\Delta_{PUSCH}$=+4 dB

Else $\Delta_{PUSCH}$=+1 dB

In Equation (3), IotLevel(J) denotes the interference information representing an interference status from an external device, and $X_{rand}$ represents a random number ranging from "0" to "1". The present embodiment estimates that interference becomes high as IotLevel(J) becomes high.

When the power level determination unit 40 receives the power control mode information (which declares that a power control mode of a mobile station is selected based on the serving sector measurement information) and the power control input information (including the serving sector measurement information) from the power control mode select unit 30, the power level determination unit 40 determines a transmission power level of a mobile station based on the selected power control mode (designated by the power control mode information) and the power control input information (i.e. the serving sector measurement information).

Specifically, when the power level determination unit 40 receives the power control mode information (representing a power control mode according to Equation (2)) and the power control input information (including the serving sector measurement information which is used in a power level determination procedure according to Equation (2)) from the power control mode select unit 30, the power level determination unit 40 calculates the power control coefficient $X_{PL}$ in accordance with Equation (2) using the path loss PL(u) included in the serving sector measurement information. Subsequently, the power level determination unit 40 determines a power level $\Delta_{PUSCH}$ in accordance with Equation (3) using the calculated power control coefficient $X_{PL}$.

In summary, the power level determination unit 40 determines a power level $\Delta_{PUSCH}$ of a mobile station in accordance with a power control mode according to Equation (1) (which is selected by the power control mode select unit 30) and Equation (3) (adapted to the selected power control mode) when the neighboring sector measurement information capture unit 20 has captured the neighboring sector measurement information in an applied time (designated by the applied time information) in the past. In contrast, the power level determination unit 40 determines a power level $\Delta_{PUSCH}$ of a mobile station in accordance with a power control mode according to Equation (2) (which is selected by the power control mode select unit 30) and Equation (3) (adapted to the selected power control mode) when the neighboring sector measurement information capture unit 20 has not captured the neighboring sector measurement information in an applied time in the past.

The power level determination unit 40 outputs the power control information representing the power level $\Delta_{PUSCH}$ to a radio resource allocation unit (not shown) and a control information communication unit (not shown).

The power level determination unit 40 calculates the power control coefficient XPL in accordance with Equation (1) using the power reception levels $RSRP_{ServingSector}$ and $RSRP_{StrongestNeighbour}$; but this is not a restriction. Instead of the power reception levels $RSRP_{ServingSector}$ and $RSRP_{StrongestNeighbour}$, it is possible to use a path loss occurring between a serving sector and a mobile station and a path loss occurring between a neighboring sector and a mobile station in calculating the power control coefficient $X_{PL}$.

Next, the overall operation of the transmission power control device 1 will be described with reference to flowcharts of FIGS. 2 and 3. The flowchart of FIG. 2 (showing a measurement information store procedure) can be arbitrarily (or periodically) initiated during the operating state of the transmission power control device 1. The flowchart of FIG. 3 (showing a power level determination procedure) is initiated every time a resource block is allocated to a mobile station subjecting to transmission power control. In this connection, the neighboring sector measurement information capture unit 20 has already stored the applied time information in a referential area when the transmission power control device 1 initiates the flowchart of FIG. 3.

Figure 2:
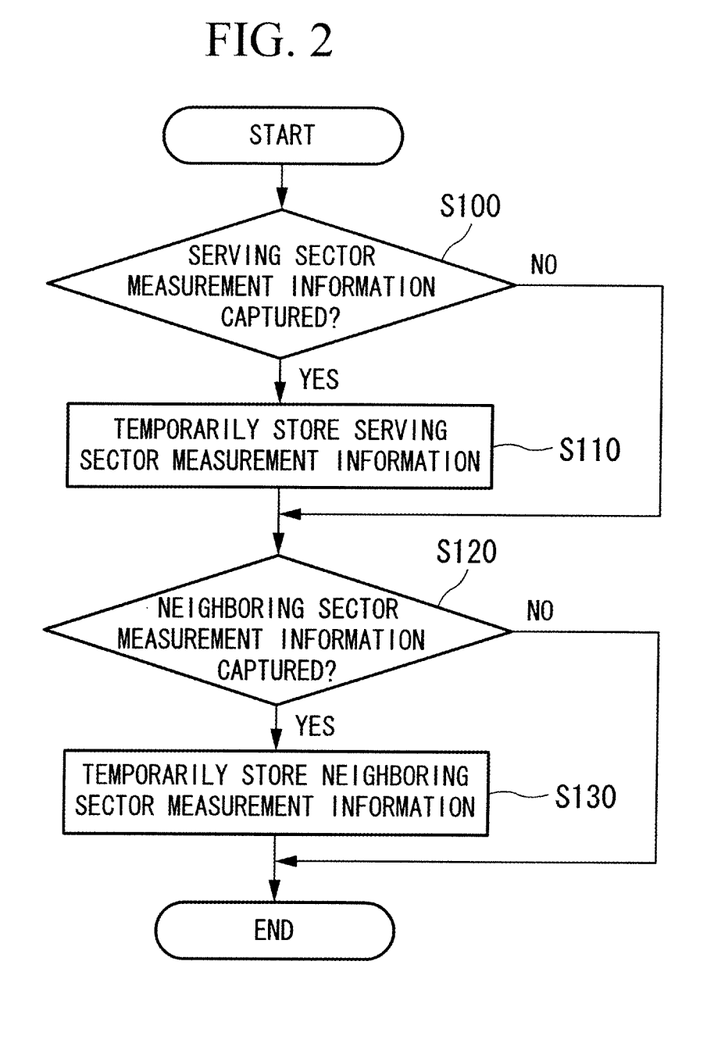
FIG. 2 is a flowchart showing a measurement information store procedure of the transmission power control device.

In FIG. 2, the serving sector measurement information capture unit 10 makes a decision as to whether or not it has captured the serving sector measurement information in step S100. When a decision result of step S100 is "YES", indicating that the serving sector measurement information capture unit 10 has captured the serving sector measurement information, the serving sector measurement information capture unit 10 temporarily stores the serving sector measurement information in connection with a mobile station in step S110. In this connection, the serving sector measurement information capture unit 10 can temporarily store the "latest" serving sector measurement information in connection with each mobile station. Alternatively, the serving sector measurement information capture unit 10 can temporarily store the serving sector measurement information in connection with the capture timing of each mobile station. When a decision result of step S100 is "NO", indicating that the serving sector measurement information capture unit 10 has not captured the serving sector measurement information, the flow directly proceeds to step S120 while skipping step S110.

Following step S110 or the decision result of "NO" in step S100, the neighboring sector measurement information capture unit 20 makes a decision as to whether or not it has captured the neighboring sector measurement information in step S120. When a decision result of step S120 is "YES", indicating that the neighboring sector measurement information capture unit 20 has captured the neighboring sector measurement information, the neighboring sector measurement information capture unit 20 temporarily stores the neighboring sector measurement information in connection with a mobile station in step S130. For example, the neighboring sector measurement information capture unit 20 temporarily stores the neighboring sector measurement information in connection with the capture timing of each mobile station. After completion of step S130, the transmission power control device 1 exits the measurement information store procedure of FIG. 2. Since the neighboring sector measurement information capture unit 20 temporarily stores the neighboring sector measurement information which has been captured in an applied time (designated by the applied time information) in the past, the neighboring sector measurement information capture unit 20 may eliminate the "previously captured" neighboring sector measurement information which has been previously captured before an applied time in the past. When a decision result of step S120 is "NO", indicating that the neighboring sector measurement information capture unit 20 has not captured the neighboring sector measurement information, the transmission power control device 1 exits the measurement information store procedure of FIG. 2 while skipping step S130.

Figure 3:
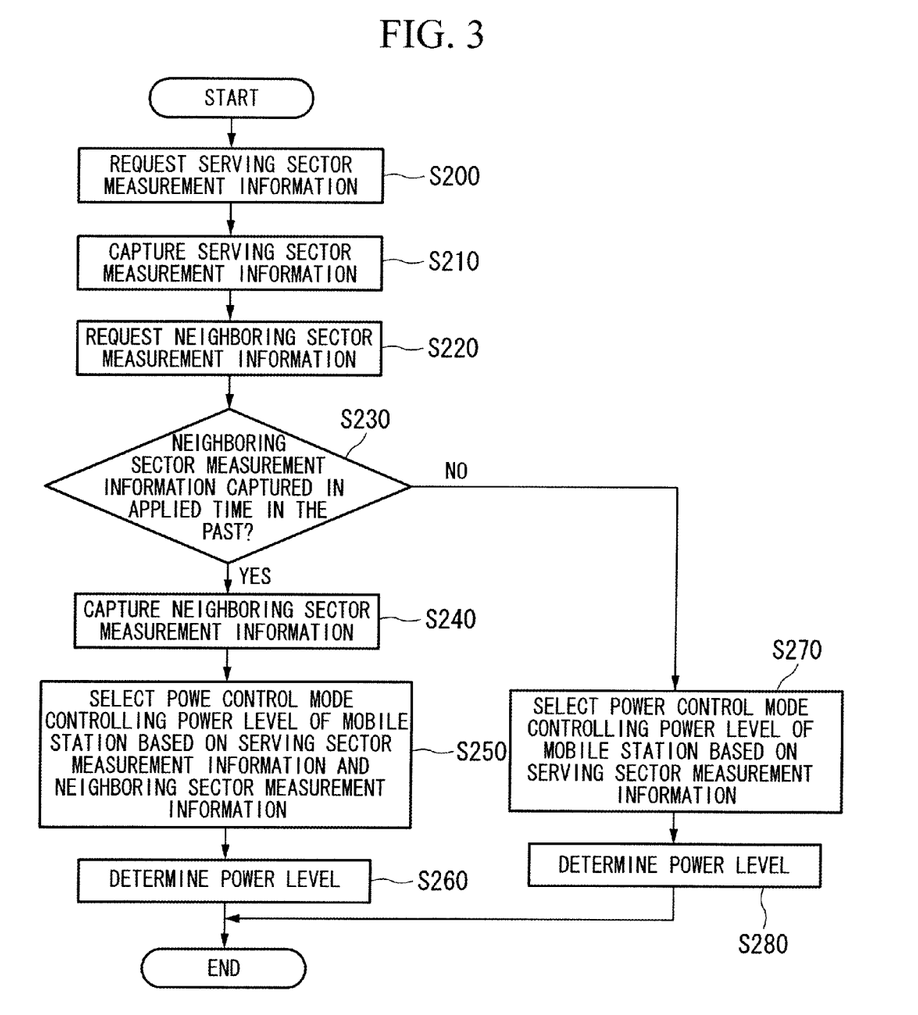
FIG. 3 is a flowchart showing a power level determination procedure of the transmission power control device.

In FIG. 3, the power control mode select unit 30 requests the serving sector measurement information capture unit 10 to provide the serving sector measurement information regarding a mobile station subjected to transmission power control in step S200. As requested, the serving sector measurement information capture unit 10 outputs the serving sector measurement information (e.g. the "latest" serving sector measurement information), which is temporarily stored therein in connection with a mobile station, to the power control mode select unit 30. In other words, the power control mode select unit 30 captures the serving sector measurement information of a mobile station from the serving sector measurement information capture unit 10 in step S210.

Subsequently, the power control mode select unit 30 requests the neighboring sector measurement information capture unit 20 to provide the neighboring sector measurement information of a mobile station subjected to transmission power control in step S220. As requested, the neighboring sector measurement information capture unit 20 refers to a temporary store area (which temporarily stores the neighboring sector measurement information in connection with the capture timing with respect to each mobile station) so as to make a decision as to whether or not the neighboring sector measurement information capture unit 20 has captured the neighboring sector measurement information in an applied time (designated by the applied time information) in the past with respect to a mobile station in step S230.

When a decision result of step S230 is "YES", indicating that the neighboring sector measurement information capture unit 20 has captured the neighboring sector measurement information in the applied time in the past with respect to the mobile station, the neighboring sector measurement information capture unit 20 outputs the neighboring sector measurement information (e.g. the "latest" neighboring sector measurement information) of the mobile station to the power control mode select unit 30. In other words, the power control mode select unit 30 captures the neighboring sector measurement information of the mobile station from the neighboring sector measurement information capture unit 20 in step S240.

Subsequently to step S240, the power control mode select unit 30 selects a power control mode according to Equation (1) based on the serving sector measurement information and the neighboring sector measurement information. Next, the power control mode select unit 30 outputs the power control mode information indicating the selected power control mode and the power control input information (including the serving sector measurement information captured in step S210 and the neighboring sector measurement information captured in step S240) to the power level determination unit 40.

The power level determination unit 40 determines a power level of a mobile station based on the power control mode information and the power control input information from the power control mode select unit 30 in step S260. Specifically, the power level determination unit 40 determines a power level $\Delta_{PUSCH}$ based on the power control mode according to Equation (1) selected in step S250, the serving sector measurement information captured in step S210, and the neighboring sector measurement information captured in step S240, as well as Equation (3). Thereafter, the transmission power control device 1 exits the power level determination procedure of FIG. 3.

When a decision result of step S230 is "NO", indicating that the neighboring sector measurement information capture unit 20 has not captured the neighboring sector measurement information of the mobile station in the applied time in the past, the neighboring sector measurement information capture unit 20 cannot output the neighboring sector measurement information of the mobile station to the power control mode select unit 30. In other words, the power control mode select unit 30 cannot capture the neighboring sector measurement information of the mobile station from the neighboring sector measurement information capture unit 20.

Following step S230 whose decision result is "NO", the power control mode select unit 30 selects a power control mode according to Equation (2) based on the serving sector measurement information in step S270. The power control mode select unit 30 outputs the power control mode information indicating the selected power control mode and the power control input information (including the serving sector measurement information captured in step S210) to the power level determination unit 40.

The power level determination unit 40 determines a power level of a mobile station based on the power control mode information and the power control input information from the power control mode select unit 30 in step S280. Specifically, the power level determination unit 40 determines a power level $\Delta_{PUSCH}$ based on the power control mode according to Equation (2) selected in step S270, and the serving sector measurement information captured in step S210, as well as Equation (3). Thereafter, the transmission power control device 1 exits the power level determination procedure of FIG. 3.

According to the flowcharts of FIGS. 2 and 3, the serving sector measurement information capture unit 10 temporarily stores the serving sector measurement information therein (see step S110 in FIG. 2), wherein in response to a request from the power control mode select unit 30, the serving sector measurement information capture unit 10 outputs the "temporarily stored" serving sector measurement information to the power control mode select unit 30 (see step S210 in FIG.

3); but this is not a restriction. It is possible to modify the transmission power control device 1 such that the serving sector measurement information capture unit 10 supplies the serving sector measurement information to the power control mode select unit 30 every time it captures the serving sector measurement information.

As described above, the transmission power control device 1 determines a power level of a mobile station in accordance with a power control mode according to Equation (1) using the neighboring sector measurement information when the neighboring sector measurement information capture unit 20 has captured the neighboring sector measurement information (which is detected in a base station with respect to a neighboring sector which differs from a serving sector). In contrast, the transmission power control device 1 determines a power level of a mobile station in accordance with a power control mode according to Equation (2), which does not need the neighboring sector measurement information, when the neighboring sector measurement information capture unit 20 cannot capture the neighboring sector measurement information.

Recently, engineers have discussed a possibility that inter-sector interference can be reduced by way of a power control mode based on a difference between a path loss occurring between a serving sector and a mobile station and a path loss occurring between a neighboring sector and a mobile station; but the LTE technology cannot always detect a path loss occurring between a neighboring sector and a mobile station. The present embodiment is designed to cope with the LTE technology, wherein the transmission power control device 1 switches over power control modes based on a decision as to whether or not the neighboring sector measurement information can be obtained. Although the present embodiment is adapted to communication systems which cannot always detect the measurement information with regard to other sectors except for serving sectors, it is possible to reduce inter-cell interference and inter-sector interference.

In the present embodiment, the neighboring sector measurement information capture unit 20 refers to the applied time information so as to output the neighboring sector measurement information, which has been captured in the applied time in the past, to the power control mode select unit 30, so that the power control mode select unit 30 selects an appropriate power control mode of a mobile station based on a decision as to whether or not the power control mode select unit 30 has captured the neighboring sector measurement information from the neighboring sector measurement information capture unit 20; but this is not a restriction. Alternatively, the neighboring sector measurement information capture unit 20 outputs the neighboring sector measurement information to the power control mode select unit 30 every time it captures the neighboring sector measurement information, whereby the power control mode select unit 30 refers to the applied time information so as to select an appropriate power control mode of a mobile station based on a decision as to whether or not the neighboring sector measurement information capture unit 20 has captured the neighboring sector measurement information in the applied time in the past.

In the present embodiment, the power control mode select unit 30 selects a power control mode according to Equation (1) based on the serving sector measurement information and the neighboring sector measurement information when the neighboring sector measurement information capture unit 20 has captured the neighboring sector measurement information, whilst the power control mode select unit 30 selects a power control mode according to Equation (2) based on the serving sector measurement information when the neighboring sector measurement information capture unit 20 has not captured the neighboring sector measurement information; but this not a restriction. Alternatively, the power control mode select unit 30 selects Equations (1) and (3) when the neighboring sector measurement information capture unit 20 has captured the neighboring sector measurement information, whilst the power control mode select unit 30 selects Equations (2) and (3) when the neighboring sector measurement information capture unit 20 has not captured the neighboring sector measurement information.

It is possible to produce programs implementing procedures and functions of the transmission power control device 1 of the present embodiment. Those programs are stored in computer-readable storage media in advance, so that any computer system can load and execute programs so as to achieve the overall functionality of the transmission power control device 1. The term "computer system" may embrace the hardware such as peripherals and the software such as an operating system (OS). In addition, the computer system having WWW connectivity may embrace homepage provider/presentation environments. The term "computer-readable storage media" refers to flexible disks, magneto-optical disks, ROM, non-volatile memory such as flash memory, portable storage media such as CD-ROM, and storage devices such as hard-disk drives installed in computer system.

The term "computer-readable storage media" further refers to any types of devices which are able to temporarily store programs therein, such as volatile memory (e.g. DRAM) installed in computer systems such as servers and clients which receive programs transmitted via networks (e.g. the Internet) and communication lines (e.g. telephone lines). In this connection, programs can be transmitted from computer systems (having storage devices storing programs) to other computer systems via transmission media or via carrier waves in transmission media. The term "transmission media" refers to electromagnetic media having information transmission capabilities, such as communication networks (e.g. the Internet) and communication lines (e.g. telephone lines). The program may represent a part of the functionality of the transmission power control device 1. Alternatively, the program may represent a difference file (or a difference program), which can be combined with a pre-installed program of a computer system so as to achieve the overall functionality of the transmission power control device 1.

Lastly, the present invention is not necessarily limited to the present embodiment and its variations, which can be further modified in various ways within the scope of the invention as defined in the appended claims.

What is claimed is:

1. A transmission power control device comprising:
a serving sector measurement information capture unit that captures serving sector measurement information of a mobile station with respect to a serving sector;
a neighboring sector measurement information capture unit that captures neighboring sector measurement information of the mobile station with respect to a neighboring sector; and
a power control mode select unit which is configured to select a first power control mode with a first power coefficient calculated based on a difference of reception power between the serving sector measurement information and the neighboring sector measurement information when the neighboring sector measurement information capture unit successfully captures the neighboring sector measurement information of the mobile station, while the power control mode select unit is configured to select a second power control mode with a second power coefficient calculated based on a path loss occurring between the mobile station and the serving sector when the neighboring sector measurement information capture unit fails to capture the neighboring sector measurement information.

2. The transmission power control device according to claim 1, wherein the power control mode select unit selects the power control mode based on a decision as to whether the neighboring sector measurement information capture unit has captured the neighboring sector measurement information in a predetermined time in the past.

3. The transmission power control device according to claim 1, wherein the neighboring sector measurement information capture unit outputs the neighboring sector measurement information, which has been captured in a predetermined time in the past, to the power control mode select unit, and wherein the power control mode select unit selects the power control mode based on a decision as to whether the power control mode select unit has received the neighboring sector measurement information from the neighboring sector measurement information capture unit.

4. The transmission power control device according to claim 1 further comprising a power level determination unit that determines a power level of the mobile station based on the power control mode which is selected by the power control mode select unit.

5. A transmission power control method comprising:
capturing serving sector measurement information of a mobile station with respect to a serving sector;
capturing neighboring sector measurement information of the mobile station with respect to a neighboring sector; and
selecting a power control mode such that a first power control mode is selected with a first power coefficient calculated based on a difference of reception power between the serving sector measurement information and the neighboring sector information when the neighboring sector information is successfully captured, while a second power control mode is selected with a second power coefficient calculated based on a path loss occurring between the mobile station and the serving sector when the neighboring sector measurement information fails to be captured.

6. A non-transitory computer-readable storage medium storing program executable by a computer according to a transmission power control method comprising the steps of:
capturing serving sector measurement information of a mobile station with respect to a serving sector;
capturing neighboring sector measurement information of the mobile station with respect to a neighboring sector; and
selecting a power control mode such that a first power control mode is selected with a first power coefficient calculated based on a difference of reception power between the serving sector measurement information and the neighboring sector information when the neighboring sector information is successfully captured, while a second power control mode is selected with a second power coefficient calculated based on a path loss occurring between the mobile station and the serving sector when the neighboring sector measurement information fails to be captured.

\* \* \* \* \*